US007028528B2

(12) United States Patent
Antonijevic

(10) Patent No.: US 7,028,528 B2
(45) Date of Patent: Apr. 18, 2006

(54) FLOWMETER PROVING DEVICE AND METHOD

(75) Inventor: Milovan Antonijevic, Rheden (NL)

(73) Assignee: Micro Motion, Inc., Boulder, CO (US)

( * ) Notice: Subject to any disclaimer, the term of this patent is extended or adjusted under 35 U.S.C. 154(b) by 99 days.

(21) Appl. No.: 10/477,406

(22) PCT Filed: May 22, 2002

(86) PCT No.: PCT/IB02/01788

§ 371 (c)(1),
(2), (4) Date: Feb. 4, 2004

(87) PCT Pub. No.: WO02/097379

PCT Pub. Date: Dec. 5, 2002

(65) Prior Publication Data

US 2004/0216509 A1 Nov. 4, 2004

(30) Foreign Application Priority Data

May 30, 2001 (GB) .................................... 0113113

(51) Int. Cl.
*G01F 25/00* (2006.01)

(52) U.S. Cl. ........................................................ 73/1.16

(58) Field of Classification Search ................. 73/1.16, 73/861.351, 861.354, 861.355, 861.356, 73/861.357, 1.35
See application file for complete search history.

(56) References Cited

U.S. PATENT DOCUMENTS 3,958,443 A 5/1976 Berrettini
4,831,866 A 5/1989 Forkert et al.
5,072,416 A 12/1991 Francisco, Jr. et al.
6,360,579 B1 * 3/2002 De Boom et al. ........... 73/1.35
6,502,466 B1 * 1/2003 Cage et al. ............ 73/861.355

FOREIGN PATENT DOCUMENTS

JP 05264476 12/1995

OTHER PUBLICATIONS

Edmund Loy, "Flow Meter Proving"; Proceedings—39th Annual Symposium on Instrumentation For The Process Industries; Texas A&M University, Dep. of Chemical Engineering, College Station, TX; 1984; pp. 53-57.

* cited by examiner

*Primary Examiner*—Charles Garber
(74) *Attorney, Agent, or Firm*—Setter Ollilia LLC

(57) ABSTRACT

A flowmeter proving device and method for use in proving a flowmeter in situ under operating conditions comprises a pair of standard Coriolis based mass flowmeters (2, 3) which are connected together in series by a conduit (7) connecting the fluid outlet (23) of the first flowmeter (2) to the fluid inlet (32) of the second flowmeter (3). A valved fluid supply conduit (4) is connected to the fluid inlet (22) of the first flowmeter (2), and a valved fluid return conduit (8) is connected to the fluid outlet (33) of the second flowmeter (3). These supply and return conduits (4 and 8) enable the device to be connected to a fluid flow line containing a flowmeter which is to be proved such that fluid flowing in the flow line will flow in series through the flowmeter to be proved and the two flowmeters (2 and 3) of the proving device. The device includes control means which is operative to use the second flowmeter (3) as a master meter to check the accuracy of the flowmeter to be proved, and the first flowmeter (2) as a check meter for the master meter (3).

15 Claims, 2 Drawing Sheets

FLOWMETER PROVING DEVICE AND METHOD

BACKGROUND OF THE INVENTION

1.Field of Invention

The invention relates to a flow meter proving device and method for proving a flow meter in situ under actual operating conditions. The device is intended primarily for use in proving mass flow meters, particularly Coriolis based mass flow meters, but may be used for checking the accuracy of any flow meter having the ability to measure intrinsic or extrinsic fluid properties when placed in a service location where the fluid is normally flowing. Such meters include densitometers, viscosimeters and volumetric flow meters, as well as mass flow meters.

2. Statement of the Problem

Coriolis based mass flowmeters are well known and have been described in numerous patents, such as U.S. Pat. Nos. 4,444,059, 4,491,025 and 4,422,338, which all describe mass flow rate meters that use vibrating tubes to impart measurable Coriolis effects which are related to mass flow rate. U.S. Pat. No. 4,491,009 describes a vibrating tube densitometer based on the structure of a Coriolis mass flowmeter. The ability of Coriolis effect mass flowmeters to measure density permits the determination of a volumetric flow rate by a simple division of the density value into the mass flow rate value. It is also well known that Coriolis effect flowmeters can be operated as viscosimeters.

Coriolis mass flowmeters are now often used for custody transfer and fiscal metering duties for many different types of fluid, particularly LPG (liquefied petroleum gas) and other hydrocarbons. For these applications meter accuracies (uncertainties) of 0.5% or even 0.1% are generally specified, and it is required to carry out periodic proving of the flowmeter in order to verify that the meter is providing flow measurement data within the accuracy specification of the meter and, if not, to reset the calibration factor of the meter. The calibration factor is the factor that the meter uses to convert electronic signals generated by the meter into direct measurements of mass, volume or other desired parameter. Coriolis based flowmeters are linear meters in that the flow calibration factor is constant with respect to flow rate.

The proving process typically entails removing the flowmeter from service for shipment to a test facility where the meter is cleaned, repaired as needed, and subjected to test measurements. Usually these involve the use of a gravimetric diverter system to cause a standard fluid having precisely known intrinsic or extrinsic fluid properties (e.g. temperature, density, velocity and volume) to flow through the meter which is to be tested. The meter under test performs flow measurements on the fluid, and these measurements are cross checked against the known fluid properties.

However, the use of gravimetric diverter systems to test flowmeters is relatively time consuming and expensive, and the systems themselves occupy a relatively large amount of space. The loss of time, space and money can be reduced by calibrating very precise meters, i.e. standard meters, against gravimetric standards for subsequent use in calibrating other meters under test. For the test the standard meter is connected in series with the meter under test to perform simultaneous flow measurements. The measurement data from the meter under test is used in calculations with measurement information from the standard meter on the same fluid volume to provide or confirm a flow calibration factor for the meter under test. The metering industry generally requires the uncertainty in output from a standard meter to be at least three times less than the manufacturer's accuracy specification of the meter under test. Thus, a test meter that is specified as being accurate to 0.1% of a flow rate requires a standard meter that is accurate to at least 0.033% for proving and calibration purposes.

As mentioned above, most of the currently employed proving methods involve removing the flowmeter to be tested from the flow line in which it operates. However, there are distinct advantages to be able to prove a flowmeter in situ, since this automatically compensates for operating conditions which may affect the accuracy and performance repeatability of the flowmeter, such as mechanical stress on the meter, piping configurations, flow variations, fluid pressure and ambient temperature changes, and fluid composition. One known in situ proving method involves using a device known as a "compact prover" but this is a volumetric device and requires an additional device for measuring the density of the fluid in order to verify mass flow measurements. The device is also relatively large and expensive.

SUMMARY OF THE INVENTION

One of the objects of the invention, therefore, is to provide a flowmeter proving device for use in proving a flowmeter in situ under operating conditions which is simple to operate and is relatively compact and inexpensive.

To this end, the invention provides a flowmeter proving device comprising first and second standard Coriolis based mass flowmeters which have been calibrated to a predetermined accuracy specification, means connecting the fluid outlet of the first flowmeter to the fluid inlet of the second flowmeter to connect said flowmeters in series, supply and return conduits respectively connected to the fluid inlet of the first flowmeter and to the fluid outlet of the second flowmeter to enable the device to be connected to a fluid flow line containing a flowmeter which is to be proved such that fluid flowing in the flow line will flow in series through said flowmeter to be proved and said first and second flowmeters of the proving device, and control means for connection to said first and second flowmeters and to said flowmeter to be proved to receive flow measurement signals therefrom, said control means being operative to use one of said first and second flowmeters as a master meter to check the accuracy of the flowmeter to be proved and the other of said first and second flowmeters as a check meter for said master meter.

Preferably the first and second flowmeters are substantially identical to each other, and the device will be used for proving flowmeters which are of much the same size in the sense that their nominal flow range corresponds to the flow range over which the first and second standard flowmeters of the proving device have been calibrated to a predetermined accuracy. For example, a flowmeter in service having an optimum flow range of, say, 10 to 40 kg per minute and an accuracy specification of 0.1% would require a proving device in which the first and second flowmeters also have an optimum flow range of 10 to 40 kg per minute but have been calibrated to an uncertainty which is a predetermined factor less than the specified accuracy of the meter to be tested. Generally, it will be acceptable for the standard flowmeters of the proving device to be calibrated to an uncertainty of about 0.03% or less if the device is to be used to prove a flowmeter having an accuracy specification of 0.1%.

In use, if the flow line containing the flowmeter to be proved is already fitted with valved prover connections, the supply and return conduits of the proving device in accordance with the invention will simply be coupled to the prover connections whenever a proving run is to be carried out on the flow meter in the flow line. A shut off valve in the flow line between the prover connections is then closed so that the fluid flowing in the flow line is caused to bypass the shut off valve by flowing in series through the first and second flowmeters of the proving device.

The control means, which preferably includes a central processing unit, then operates to take a sequence of flow measurement signals from the flowmeter under test and from the first and second flowmeters of the proving device, and from these signals the processing unit calculates flow measurement values for each of the three flowmeters. Preferably the processing unit is operative to receive and process flow measurement signals provided simultaneously by the flowmeters of the proving device and the flowmeter to be tested during the same time interval so that the measurements are taken under identical conditions. This avoids the possibility that variations, such as pressure surges, in the system could give rise to unequal measurements.

The control means then compares the flow measurement data obtained from the flowmeter in the flow line with the flow measurements obtained from the master meter of the proving device, and if the values are the same within a predetermined acceptable tolerance level the device indicates that the accuracy of the flowmeter in the flow line has been verified. If the measurement values are outside the predetermined acceptable tolerance the device indicates, for example on a print out or display screen, that the calibration factor of the flowmeter in the flow line should be reset to an indicated value determined by the control means. The operator then resets the calibration factor in the transmitter of the flowmeter as required.

The control means also compares the flow measurement values obtained from the master meter with those obtained from the check meter and will indicate a fault if they do not correspond to within a predetermined tolerance.

Preferably the proving device in accordance with the invention will include temperature and pressure sensors for providing the control means with temperature and pressure measurements of fluid flowing through the device. These will enable the device to derive density measurements from the mass flow measurements obtained from the flowmeters, and to calculate a volumetric flow measurement if the flowmeter in the flow line is a volumetric flowmeter, such as a positive displacement meter or orifice meter.

Preferably the fluid outlet of the first flowmeter is connected to the fluid inlet of the second flowmeter by an intermediate conduit, and the temperature and pressure sensors are mounted on this intermediate conduit.

Preferably the first and second flowmeters of the proving device will be mounted on a common base, and the supply and return conduits may each be provided with its own shut off valve. This will enable fluid remaining in the device after completion of a proving run to be retained in the device when it is disconnected from the flow line, and minimises any spillage or wastage of the fluid. The shut off valves will usually be manually operated but, if preferred, may be electrically operable under the control of the control means.

DETAILED DESCRIPTION OF EMBODIMENTS

Figure 1:
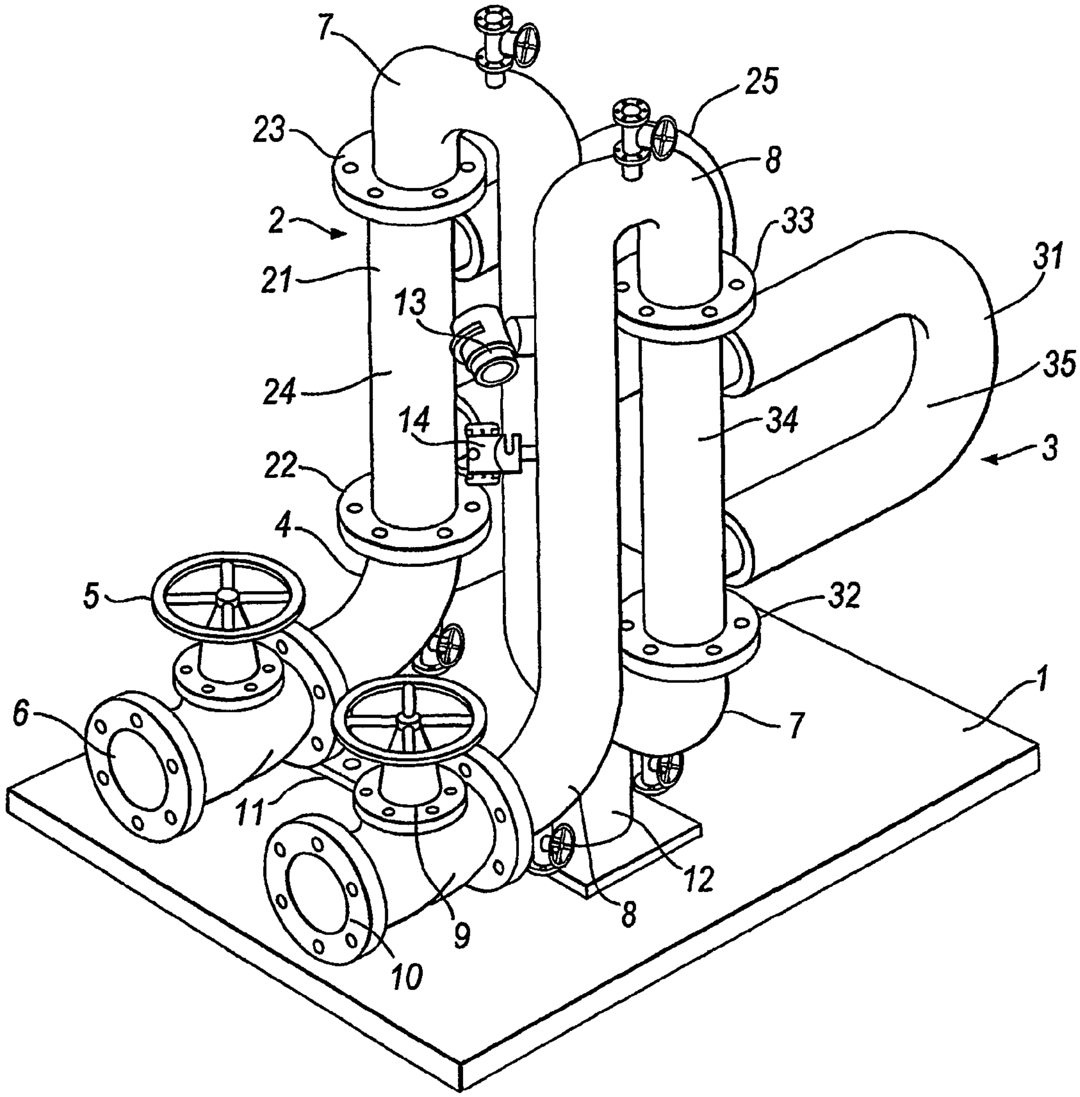
FIG. 1 shows a perspective view of the device.

The embodiment of the flowmeter proving device shown in FIG. 1 comprises a support base 1 on which two identical standard Coriolis based mass flowmeters 2, 3 are mounted side by side. The size (nominal flow range) of the flowmeters used will be dependent on the size of the service flowmeters which are required to be proved by the device. In the embodiment shown each of the flowmeters 2, 3 is constituted by an ELITE (TM) sensor 21, 31 manufactured by Micro Motion Inc. (for example model no. CMF200 having a nominal flow range of 0 to 725 kg per minute), and a transmitter 26, 36 (not shown in FIG. 1) responsive to output signals from the sensor to provide an accurate measurement of the mass flow rate through the sensor. The transmitter, which may be an ELITE model RFT9739 also manufactured by Micro Motion Inc., may be mounted directly on the sensor casing or may be provided separately for remote mounting and connection to the sensor by suitable wiring cables.

Each of the flowmeter sensors 21, 31 comprises a fluid inlet 22, 32 and a fluid outlet 23, 33 at opposite ends of a mounting bar 24, 34, and a pair of parallel U-shaped flow tubes (not shown) which are housed within a protective U-shaped casing 25, 35 and through which fluid entering the inlet 22, 32 flows to the outlet 23, 33. Also housed within the casing 25, 35 of each flowmeter sensor are a driver (not shown) for vibrating the flow tubes at a resonant frequency in response to signals received from the transmitter, and pick-offs (not shown) responsive to vibration of the flow tubes to provide the output signals to the transmitter.

As also shown in FIG. 1, the fluid inlet 22 of the first flowmeter sensor 21 is connected by bolted flanges to a fluid supply conduit 4 provided with a manually operable shut-off valve 5 and a coupling flange 6 at its inlet end. The fluid outlet 23 of the first flowmeter sensor 21 is connected by bolted flanges to one end of an S-shaped intermediate conduit 7 which is connected at its other end to the fluid inlet 32 of the second flowmeter sensor 31, also by bolted flanges. The fluid outlet 33 of the second flowmeter sensor 31 is connected by bolted flanges to a return conduit 8 which is fitted with a manually operable shut-off valve 9 and a flanged coupling 10 at its outlet end situated level with the inlet end of the supply conduit 4 just above the support base 1.

The two flowmeters 2, 3 are mounted on the support base 1 by means of mounting brackets 11, 12 which are bolted or otherwise fixed to the base 1, the bracket 11 being secured to the supply conduit 4 and the bracket 12 being secured to both the intermediate conduit 7 and the return conduit 9.

The device also includes conventional pressure and temperature sensors 13, 14 mounted on the intermediate conduit 7 for transmitting to the transmitters 26, 36 of the two flowmeters 2, 3 information relating to the pressure and temperature of fluid flowing through the device. Alternatively, the pressure and temperature sensors 13, 14 may be mounted on the return conduit 8.

The proving device of this embodiment can be used for proving flowmeters in service having a nominal flow range which is substantially the same as (or within) that of each of the flowmeters 2, 3 of the device (in the present case 0 to 725 kg per minute). Since ELITE CFM 200 flowmeters in service may have an accuracy of plus or minus 0.1%, the flowmeters 2 and 3 of the proving device will need to be standard flowmeters preferably having an accuracy (uncertainty) of 0.03% as determined in accordance with ISO 5168 standard. The standard flowmeters may be calibrated against a gravimetric diverter system, and an uncertainty level of 0.03% will mean that the standard flowmeter will agree with the calibrating device with 95% confidence.

The proving device also comprises separate control means in the form of a CPU or computer (not shown in FIG. 1) for connection to the transmitters of the two flowmeters of the device and to the transmitter of the service flowmeter which is to be proved.

Figure 2:
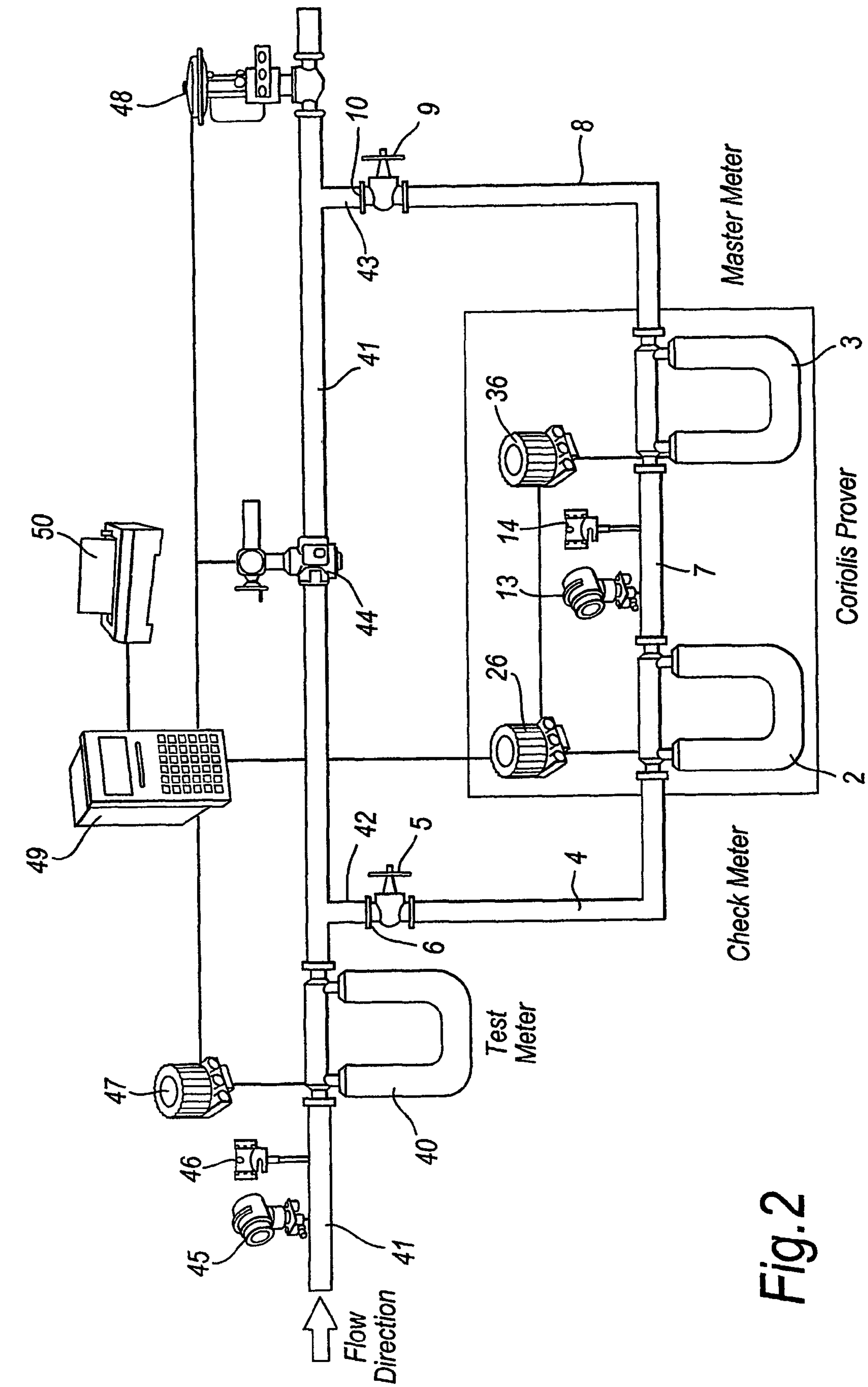
FIG. 2 shows a schematic representation of the device connected in a flow line for the purpose of proving a flowmeter which is in service in the flow line.

FIG. 2 is a schematic diagram showing how the proving device will be used in the field to prove a flowmeter 40 while it remains in service in a fluid flow line 41. As shown, the inlet and outlet ends 6, 10 of the proving device are connected to branches 42, 43 of the flow line 41 downstream of the service flowmeter 40 and on opposite sides of a block and bleed valve 44 located in the flow line 41, although the device could be connected upstream of the service flowmeter if preferred. The flow line is also fitted with pressure and temperature sensors 45, 46 adjacent the service meter 40 for providing fluid temperature and pressure information to the transmitter 47 of the service flowmeter 40, and a flow control valve 48 for controlling the rate of flow of fluid through the flow line. The control computer 49 of the proving device is connected to the transmitter 47 of the service flowmeter 40 and also to the transmitters 26 and 36 of the two standard flowmeters 2, 3 of the proving device. In addition the control computer 49 is connected to the block and bleed valve 44, the fluid control valve 48, and to a printer or other output device 50.

In order to carry out a proving run on the service meter 40 the flow control valve 48 is adjusted by the control computer 49 to bring the fluid flow rate through the service meter 40 to within the optimum accuracy range of the standard flowmeters 2 and 3 of the proving device, and the block and bleed valve 44 is closed. At the same time the prover connection shut off valves 5 and 6 are opened so that the fluid flowing through the flow line 41 is caused to flow in series through the flowmeters 2 and 3 of the proving device after flowing through the service meter 40. The control computer 49 controls the transmitters 26, 36, 47 of the proving device flowmeters 2, 3 and the service flowmeter 40 so that each measures the fluid flow rate simultaneously, and this flow rate information is supplied to the control computer 49 for processing. This processing involves application of master metering with reproducibility verification software whereby the flowmeter 3 of the proving device is used as a master meter to prove the service flowmeter 40, and the flowmeter 2 of the proving device is used as a check meter to confirm that the master meter is reading accurately. The control computer 49 then indicates via the output device 50 whether the accuracy of the service flowmeter is verified or needs correction by adjustment of the calibration factor entered in its transmitter 47.

If the service meter 40 under test is configured for mass flow measurement, master metering determines the mass meter factor for the service flowmeter 40 using the equation:

$$MF_m = MF_{master} M_{master} / M_{meter}$$

where:

$M_{master}$=mass measured by the master meter 3; and $M_{meter}$=mass measured by the service meter 40 under test The mass measured by both the master meter 3 and the service meter 40 is determined by counting pulses from the meter transmitter and dividing the number of pulses by the K factor of the meter. Since Coriolis flowmeters are very linear flow measurement devices, a meter factor for the master meter is generally not used. Instead, the master meter is calibrated to provide an extremely linear output corresponding as closely to a meter factor of 1.0000 as possible.

A proving run should be long enough firstly to ensure that enough pulses are accumulated to minimise errors in pulse counting (usually a minimum of 10,000 pulses should be accumulated from each meter), and secondly to provide a repeatable output from the meters. The run duration should not be less than one minute, but usually a run time of from one to two minutes is sufficient. Preferably at least three separate proving runs should be performed.

For the verification process the service meter under test is compared against the check meter to give a value $MF_1=MF_{test}/MF_{check}$, and the master meter is compared against the check meter to give a value $MF_2=Mf_{master}/MF_{check}$. A comparison of the test meter against the master meter can then be calculated to give a value $MF_3=MF_1/MF_2=MF_{test}/MF_{master}$.

If the meter factor of only one of the meters is shifted, the factors of the other two meters remain the same (e.g. 1.0000). Thus, one of the values $MF_1$, $MF_2$ and $MF_3$ will also be 1.0000.

If $MF_1$=1.0000, then $MF_{test}$ and $MF_{check}$ are both 1.0000 and the master meter is shifted. If $MF_2$=1.0000, then $MF_{master}$ and $MF_{check}$ are both 1.0000 and the test meter is shifted. If $MF_3$=1.0000, then $MF_{test}$ and $MF_{master}$ are both 1.0000 and the check meter is shifted.

These results are summarised in the following table where $MF_A$ is the meter factor of the service meter under test, $MF_B$ is the meter factor of the check meter, and $MF_C$ is the meter factor of the master meter.

| $MF_A$ | $MF_B$ | $MF_C$ | $MF_1 = MF_A/MF_B$ | $MF_2 = MF_C/MF_B$ | $MF_3 = MF_1/MF_2$ | Adjustment |
|---|---|---|---|---|---|---|
| No Meter shifted | | | | | | |
| 1.0000 | 1.0000 | 1.0000 | 1.0000 | 1.0000 | 1.0000 | Excellent |
| One Meter shifted | | | | | | |
| 1.0015 | 1.0000 | 1.0000 | 1.0015 | 1.0000 | 1.0015 | $MF_A = MF_1 = 1.0015$ |
| 1.0000 | 1.0015 | 1.0000 | 0.9985 | 0.9985 | 1.0000 | $MF_B = 1/MF_1 = 1.0015$ |
| 1.0000 | 1.0000 | 1.0015 | 1.0000 | 1.0015 | 0.9985 | $MF_C = MF_2 = 1.0015$ |
| 0.9985 | 1.0000 | 1.0000 | 0.9985 | 1.0000 | 0.9985 | $MF_A = MF_1 = 0.9985$ |
| 1.0000 | 0.9985 | 1.0000 | 1.0015 | 1.0015 | 1.0000 | $MF_B = 1/MF_1 = 0.9985$ |
| 1.0000 | 1.0000 | 0.9985 | 1.0000 | 0.9985 | 1.0015 | $MF_C = MF_2 = 0.9985$ |
| All Meters shifted | | | | | | Investigate Meters |

The invention claimed is:

1. A flow meter proving device for use in proving a flow meter in situ under operating conditions, comprising:

first and second Coriolis based mass flow meters which have been calibrated to a predetermined accuracy specification;

means connecting the fluid outlet of the first flow meter to the fluid inlet of the second flow meter to connect said flow meters in series;

supply and return conduits respectively connected to the fluid inlet of the first flow meter and to the fluid outlet of the second flow meter to enable the device to be connected to a fluid flow line containing a flow meter which is to be proved such that fluid flowing in the flow line will flow in series through said flow meter to be proved and said first and second flow meters of the proving device; and control means for connection to said first and second flow meters and to said flow meter to be proved to receive flow measurement signals therefrom, said control means being operative to use one of said first and second flow meters as a master meter to check the accuracy of the flow meter to be proved and the other of said first and second flow meters as a check meter for said master meter.

2. A device according to claim 1, in which the first and second flow meters are substantially identical to each other.

3. A device according to claim 1, in which the accuracy of each of the first and second flow meters is calibrated to an uncertainty of about 0.03% or less.

4. A device according to claim 1, in which the first and second flow meters are mounted on a common base.

5. A device according to claim 1, including temperature and pressure sensors for providing the control means with temperature and pressure measurements of fluid flowing through the device.

6. A device according to claim 5, in which the fluid outlet of the first flow meter is connected to the fluid inlet of the second flow meter by an intermediate conduit, and the temperature and pressure sensors are mounted on said intermediate conduit.

7. A device according to claim 1, in which the supply and return conduits each contain a shut off valve.

8. A device according to claim 1, in which the control means includes a central processing unit which is operative to receive and process flow measurement signals provided by the master meter and the check meter and the flow meter to be proved during the same time interval.

9. A method of proving a flow meter in situ in a flow line under operating conditions, the method comprising the steps of:

connecting the supply and return conduits of a proving device to the flow line upstream or downstream of the flow meter to be proved and on opposite sides of a shut off valve in the flow line, with the proving device including a first Coriolis flow meter and a second Coriolis flow meter;

closing the shut off valve so as to cause the fluid in the flow line to flow in series through the flow meter to be proved and the first and second Coriolis flow meters of the proving device;

obtaining a measurement of the fluid flow rate from each of the flow meters;

comparing the flow rate measured by the flow meter to be proved with the flow rate measured by one of the first and second Coriolis flow meters of the proving device to check the accuracy of the flow meter to be proved; and comparing the flow rate measured by the other of the first and second Coriolis flow meters of the proving device with the flow rate measured by said one flow meter to confirm the accuracy of said one flow meter.

10. The method of claim 9, wherein the first and second Coriolis flow meters are substantially identical to each other.

11. The method of claim 9 further comprising the step of calibrating the accuracy of each of the first and second Coriolis flow meters to an uncertainty of about 0.03% or less.

12. The method of claim 9 further comprising the step of mounting the first and second Coriolis flow meters to a common base.

13. The method of claim 9 further comprising the step of providing temperature and pressure sensors for supplying the control means with temperature and pressure measurements of fluid flowing through the device.

14. The method of claim 9 further comprising the step of providing shut off valves to the supply and return conduits.

15. The method of claim 9 further comprising the steps of receiving and processing flow measurement signals provided by the first Coriolis flow meter and the second Coriolis flow meter and the flow meter to be proved during the same time interval.

* * * * *